W. E. CADY.
AIR BRAKE HANDLE.
APPLICATION FILED MAR. 18, 1920. RENEWED APR. 13, 1922.

1,423,185.    Patented July 18, 1922.

Witnesses,
C. E. Thedy.
Thos. S. Donnelly

Inventor,
Willis E. Cady.
By Joshua R H Potts,
His Attorney.

UNITED STATES PATENT OFFICE.

WILLIS E. CADY, OF CHICAGO, ILLINOIS.

AIR-BRAKE HANDLE.

1,423,185.　　　　　Specification of Letters Patent.　　Patented July 18, 1922.

Application filed March 18, 1920, Serial No. 366,897. Renewed April 13, 1922. Serial No. 552,380½.

*To all whom it may concern:*

Be it known that I, WILLIS E. CADY, a citizen of the United States, and a resident of the city of Chicago, county of Cook, and State of Illinois, have invented certain new and useful Improvements in Air-Brake Handles, of which the following is a specification.

My invention relates to new and useful improvements in air brake handles, and has for its object the provision of an air brake handle which will be simple in structure, economic of manufacture and highly efficient in use. Another object is the provision of an air brake handle having an adjustable head adaptable for use with air post heads of slightly different dimensions.

Other objects will appear hereinafter.

The invention consists in the combinations and arrangements of parts hereinafter described and claimed.

Figure 1:
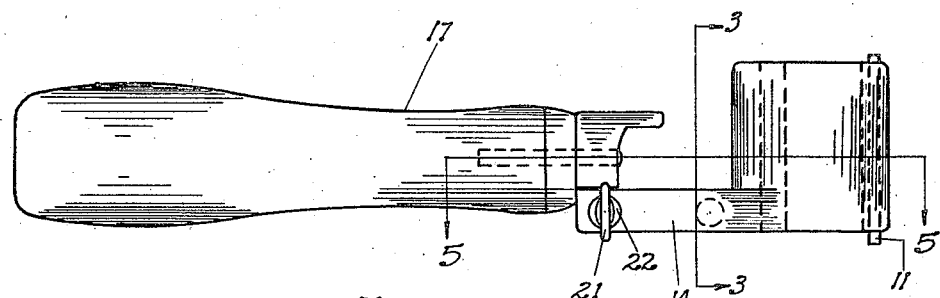
Figure 2:
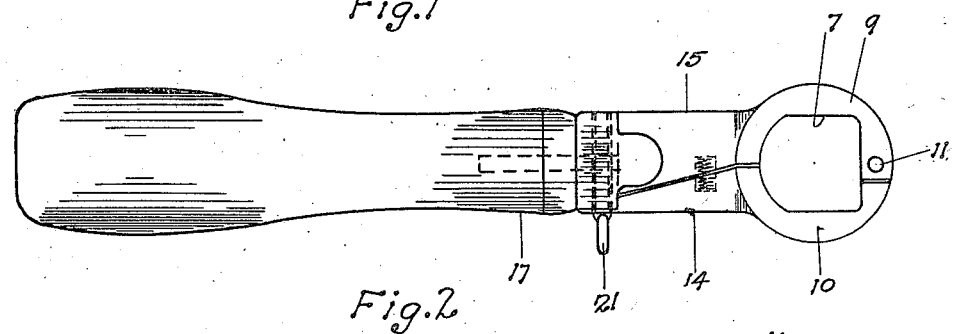
Figure 4:
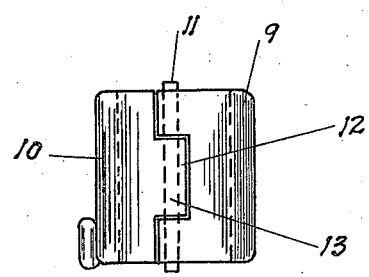
Figure 3:
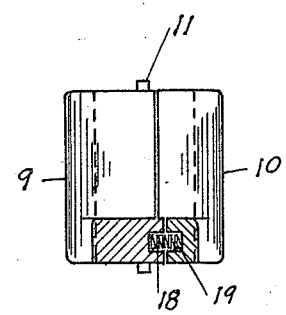
Figure 5:
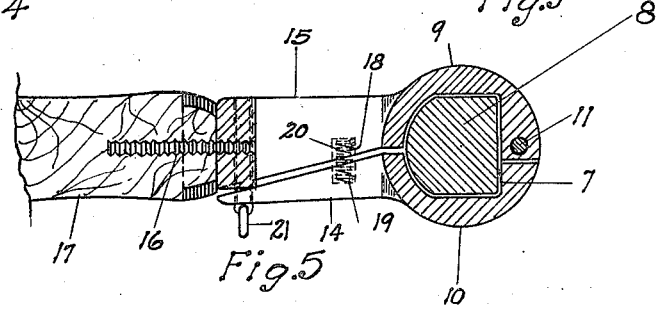

The invention will be best understood by reference to the accompanying drawings forming a part of this specification, and in which, Fig. 1, is a side elevational view of the invention, Fig. 2, a top plan view of the invention, Fig. 3, a sectional view taken on substantially line 3—3 of Fig. 1, Fig. 4, a rear elevational view of the invention, and Fig. 5, a sectional view taken on substantially line 5—5 of Fig. 1.

In operating air brakes, the operator controls the same by means of a handle which is mounted upon the air post head of the mechanism. This handle is used for turning the air post head so as to interrupt the flow of the compressed air into the brake operating parts of the device. The operating handle is attached to or sometimes made integral with a socket bearing head which fits over the air post head. This socket is usually provided with a suitable brass bushing, and after repeated use this bushing becomes worn, so that the air post head is not snugly received within the socket and considerable play is thereby permitted in the operating handle. To overcome this play in the operating handle so that upon turning the handle the air post head immediately responds and is caused to immediately rotate, I provide an air brake handle having a head provided with the usual socket 7 in which is receivable the air post head 8. The socket bearing head comprises two sections, 9 and 10, which are pivotally connected at their rearward side by a suitable pin or rivet 11. As shown in Fig. 4, the section 9 is provided with a recess 12 in which is seated a tongue 13 provided upon the section 10. Projecting from the head proper is a suitable arm or stem, to which is secured, by a suitable screw or bolt 16, the handle 17. In my device, the stem projecting from the head proper comprises two co-operating parts 14 and 15. In the member 15 is provided a socket 18, and in the member 14 a socket 19 is provided, which is in substantial alignment with the socket 18. A spiral spring is seated in these sockets so as to normally force the members 14 and 15 outwardly from each other and thereby enlarge the socket 7. A suitable set screw 21 is provided, which is threaded into the portion 15 and projected through an opening 22 formed in the member 14. The opening 22 is formed of greater diameter than the set screw proper, so as to permit a swinging of the parts comprising the head, as will be readily understood. Upon loosening the set screw 21, the spiral spring 20 forces the members 14 and 15 apart and thereby enlarges the socket in which the air post head is engaged. Upon tightening the set screw, this socket portion is diminished in size, and a secure engagement of the air post head is thereby insured, the same being clamped between the members 10 and 9. It is thus seen that the air brake handle which I have provided may be used with air post heads of varying dimensions, and yet, at the same time, reduce or entirely eliminate any play of the air brake handle head upon the air post head. In constructing the head which comprises the parts 9 and 10, I prefer to form the same from brass, or some other suitable material, which will be such as to eliminate the necessity of a bushing, as is now ordinarily used.

By forming the parts with the recess 12 and the tongue 13, and projecting the pin 11 through the tongue 13, the pivotal movement of the parts 9 and 10 is thereby limited, inasmuch as when the members 14 and 15 are moved outwardly from each other, the edge of the tongue 13 will engage against the portion 9 in the recess 12, and thereby prevent any further pivotal movement. This construction is such that should the set screw 21 become lost, or for any reason misplaced, the head may still be used for turning the air post head, inasmuch as the maximum size of the opening will still be sufficiently small to prevent a complete turning of the air post head therein.

While I have illustrated and described the preferred form of construction for carrying my invention into effect, this is capable of variation and modification without departing from the spirit of the invention, I, therefore, do not wish to be limited to the precise details of construction set forth, but desire to avail myself of such variations and modifications as come within the scope of the appended claims.

Having described my invention, what I claim as new and desire to secure by Letters Patent is:—

1. An air brake handle comprising a socket bearing head formed from a plurality of sections pivotally connected together adjacent their outer ends; a handle rigidly fixed on the inner end of one of said sections; a set screw positioned through one of the said sections and engaging a bore provided in the other of the said sections for adjusting the relative position of said sections to each other; and a resilient member positioned in each of said sections for forcing one of said sections outwardly upon releasing said set screw, substantially as described.

2. An air brake handle comprising a socket bearing head formed from a plurality of sections pivotally connected together adjacent their outer ends; a recess formed in one of said sections; a tongue formed on the other of said sections adapted to limit the pivotal movement of said sections; a handle rigidly fixed on one end of one of said sections; and a set screw positioned through one of the said sections and engaging a bore provided in the other of the said sections for adjusting the relative position of said sections to each other, substantially as described.

3. An air brake handle comprising a socket bearing head formed from a plurality of sections pivotally connected together adjacent their outer ends; a recess formed in one of said sections; a tongue formed on the other of the said sections adapted to limit the pivotal movement of said sections; a sectional stem integrally formed on each of said sections comprising said head; a handle rigidly mounted on one end of one of the said stem sections; a set screw positioned in said stem sections for adjusting the relative position of said stem sections to each other; a resilient member positioned in registering sockets provided in said stem sections for forcing one of said stem sections outwardly upon releasing said set screw, substantially as described.

In testimony whereof I have signed my name to this specification in the presence of two subscribing witnesses.

WILLIS E. CADY.

Witnesses:
B. G. RICHARDS,
ROSE K. TRIB.